US009952478B2

United States Patent
Hong et al.

(10) Patent No.: US 9,952,478 B2
(45) Date of Patent: Apr. 24, 2018

(54) DISPLAY DEVICE WITH POSITIVE POLARITY AND NEGATIVE POLARITY PIXELS AND METHOD FOR DRIVING THE SAME

(71) Applicant: LG Display Co., Ltd., Seoul (KR)

(72) Inventors: Kwangpyo Hong, Gumi-si (KR); JoongLok Song, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 34 days.

(21) Appl. No.: 14/455,442

(22) Filed: Aug. 8, 2014

(65) Prior Publication Data
US 2015/0325197 A1 Nov. 12, 2015

(30) Foreign Application Priority Data

May 8, 2014 (KR) .................. 10-2014-0054537

(51) Int. Cl.
*G09G 3/36* (2006.01)
*G02F 1/1362* (2006.01)
*G09G 5/18* (2006.01)

(52) U.S. Cl.
CPC ..... *G02F 1/136286* (2013.01); *G09G 3/3614* (2013.01); *G09G 3/3688* (2013.01); *G09G 3/3696* (2013.01); *G09G 5/18* (2013.01); *G09G 2300/0404* (2013.01); *G09G 2310/0289* (2013.01); *G09G 2310/0297* (2013.01); *G09G 2330/023* (2013.01)

(58) Field of Classification Search
CPC .......... G09G 3/3696; G09G 5/00; G09G 3/36; G06F 3/02; G06F 3/041; G06F 3/045
USPC ........................................................ 345/205
See application file for complete search history.

(56) References Cited

U.S. PATENT DOCUMENTS

| 2007/0279360 A1* | 12/2007 | Park | G09G 3/3614 345/94 |
| 2007/0291190 A1* | 12/2007 | Shin | G09G 3/3696 349/37 |
| 2010/0171772 A1* | 7/2010 | Guan | G09G 3/3614 345/690 |

(Continued)

FOREIGN PATENT DOCUMENTS

| CN | 2936414 A | 8/2006 |
| CN | 101770104 A | 7/2010 |

(Continued)

OTHER PUBLICATIONS

Chinese Office Action, Chinese Application No. 201410735093.2, dated Sep. 29, 2017, 13 pages.

*Primary Examiner* — Pegeman Karimi
(74) *Attorney, Agent, or Firm* — Fenwick & West LLP

(57) ABSTRACT

Disclosed are a display device and a method of driving the same. The display device includes: a panel on which pixels, defined by intersections of a plurality of gate lines and a plurality of data lines, are alternately connected to one side and another side of the data line and the gate line; a data driver which supplies a data voltage having a different polarity to the data lines in odd columns even columns; and, a gate driver which supplies a gate voltage, which has first polarity and corresponds to a data voltage having the first polarity, to gate lines in odd rows, and supplies a gate voltage, which has a second polarity, and corresponds to a data voltage having the second polarity, to gate lines in even rows.

16 Claims, 10 Drawing Sheets

(56) References Cited

U.S. PATENT DOCUMENTS

| | | | |
|---|---|---|---|
| 2011/0115771 A1* | 5/2011 | Cheng | G09G 3/3696 345/211 |
| 2012/0293476 A1* | 11/2012 | Lee | G09G 3/3614 345/209 |
| 2013/0050171 A1* | 2/2013 | Tsai | G09G 3/3648 345/212 |
| 2013/0135282 A1* | 5/2013 | Jeon | G09G 3/3696 345/212 |
| 2013/0147698 A1* | 6/2013 | Kang | G09G 3/3674 345/88 |

FOREIGN PATENT DOCUMENTS

| | | |
|---|---|---|
| CN | 102789768 A | 11/2012 |
| KR | 10-2008-0080800 A | 9/2008 |
| KR | 10-2012-0116682 A | 10/2012 |
| KR | 10-2013-0039271 A | 4/2013 |
| KR | 10-2014-0006490 A | 1/2014 |

* cited by examiner (A)

(B)

(A)  (B)

(A)

(B)

DISPLAY DEVICE WITH POSITIVE POLARITY AND NEGATIVE POLARITY PIXELS AND METHOD FOR DRIVING THE SAME

CROSS-REFERENCE TO RELATED APPLICATION

This application claims priority from and the benefit under 35 U.S.C. § 119(a) of Korean Patent Application No. 10-2014-0054537, filed on May 8, 2014, which is hereby incorporated by reference for all purposes as if fully set forth herein.

BACKGROUND OF THE INVENTION

1. Field of the Invention

The present invention relates to a display device and a method of driving the display device.

2. Description of the Prior Art

With the development of information society, various types of requirements for a display device for displaying an image are increasing and, recently, various display devices, such as a Liquid Crystal Display (LCD), a Plasma Display Panel (PDP), and an Organic Light Emitting Diode Display Device (OLED), are being used.

Among those display devices, a Liquid Crystal Display (LCD) device includes an array substrate including a thin film transistor, which is a switching device for controlling the on/off of each pixel area, an upper substrate including color filters and/or black matrixes, a display panel including a liquid crystal layer formed between the array substrate and the upper substrate, and a driving unit for controlling the thin film transistor. In an LCD device, alignment of the liquid crystal layer is controlled according to an electric field applied between a common voltage (Vcom) electrode and a pixel (PXL) electrode provided at a pixel area, so as to adjust the permeability of light, and thereby, form an image.

Such a liquid crystal display device drives a liquid crystal panel in an inversion system in order to prevent deterioration of the liquid crystal and to improve the display quality. For the inversion system, a frame inversion system, a line inversion system, a column inversion system, a dot inversion system, or the like has been used.

The frame inversion system, the line inversion system, and the column inversion system, among the inversion driving systems, are capable of reducing electric power consumption as compared to the dot inversion system. However, they have problems in that a crosstalk phenomenon is caused, or a luminance difference occurs between an upper portion and a lower portion of the liquid crystal panel, thereby deteriorating a quality of an image. On the other hand, in the case of the dot inversion system, the deterioration of the image quality may be reduced, so that the dot inversion system may provide an image with an excellent quality as compared with the frame inversion, the line inversion and the column inversion systems. However, the dot inversion system has a problem in that it consumes a larger amount of electric power than an electric power consumption of the line inversion system or the column inversion system.

In order to improve the problems in the above-mentioned systems, a Z-inversion system has been proposed. The Z-inversion system supplies a data voltage to data lines in which pixel electrodes p and a transistors alternate on a left side and a right side, and are arranged, by the column inversion system. That is, the Z-inversion system is a type of an improved column inversion system, in which a circuit is driven by the column inversion system and a transistor of the liquid panel is arranged in an opposite direction in each line so as to implement a display in an identical manner to the dot inversion system. In other words, the Z-inversion system has a similar effect to the dot inversion system in quality of the image, and uses the column inversion system for data. Accordingly, the Z-inversion system provides an excellent quality of the image, and reduces power consumption.

FIG. 1 is a view schematically illustrating a configuration of a pixel in a Z-inversion system.

Referring to FIG. 1, pixels are defined by an intersection of a plurality of gate lines GL1, GL2, GL3, GL4 and GL5 and a plurality of data lines DL1, DL2, DL3, DL4 and DL5, in which the pixels alternate on the left side and the right side, and are connected to data lines respectively. Particularly, a transistor is located at each pixel of the data lines in such a manner that a source electrode (or a drain electrode) of the transistor alternates on the left side and the right side of the data lines and is connected to the data lines.

Referring to FIG. 1, a data voltage with a positive polarity (+) is supplied to data lines DL1, DL3 and DL5 in odd columns, and a data voltage with a negative polarity (−) is supplied to data lines DL2 and DL4 in even columns. Since the transistors of each pixel alternates between the left side and the right side of the data lines and is connected to the data lines, when the data voltage of a specific polarity is supplied to one data line, the data voltage is supplied to the pixels on the left side and the right side of the data line. FIG. 2 is a view illustrating a magnitude of a gate voltage supplied to a second gate line GL2.

Referring to part (A) of FIG. 2, a source electrode 214 of a first transistor located at the first pixel 210 is connected to the first data line DL1, and the source electrode 224 of the second transistor 222 is connected to the second data line DL2. As described above, in the Z inversion system, since a data voltage with a different polarity is supplied to each data line, a data voltage, for example, 5V, of the positive polarity (+) is supplied to a source electrode 214 of a first transistor 212 connected to the first data line DL1, and a data voltage, for example, −5V, of the negative polarity (−) is supplied to a source electrode 224 of a second transistor 222 connected to the second data line DL2.

On the other hand, the gate electrode 216 of the first transistor 212 and the gate electrode 226 of the second transistor 222 share gate line GL2. Therefore, the gate voltage supplied to the second gate line GL2 has to turn on or off both the first transistor 212 and the second transistor 222. Since the data voltage supplied to the source electrode 214 of the first transistor 212 and the data voltage supplied to the source electrode 224 of the second transistor 222 have different polarities, however, the gate voltage supplied to the second gate line GL2 has to turn on or off all transistors supplied with data voltages having different polarities.

Part (B) of FIG. 2 is a view illustrating a waveform of the gate voltage, which is capable of turning on or off the first transistor 212 and the second transistor 222.

According to a characteristic of the transistor, a VGS voltage (a voltage between the gate electrode and the source electrode, or a voltage between the gate electrode and the drain electrode), which turns on or off the transistor is determined. If the VGS voltage turning on the transistor is defined as VGS_ON, and the VGS voltage turning off the transistor is defined as VGS_off, the gate voltage of the second gate line GL2 for turning on both the first transistor 21 and the second transistor 222 has to be a voltage higher than a maximum value VD_P of the data voltage having the positive polarity (+) by VGS_ON. The gate voltage of the second gate line GL2 for turning off both the first transistor 212 and the second transistor 222 has to be a voltage lower than a minimum value VD_N of the data voltage having the negative polarity (1) by VGS_OFF. Accordingly, the gate voltage supplied to the second gate line GL2 has a pulse waveform having a value of (VD_N−VGS_OFF) as a minimum value, and a value of (VD_P+VGS_ON) as a maximum value.

However, there is a problem in that the gate voltage waveform increases consumption of electric power. For example, the gate voltage turning on the second transistor 222 is unnecessarily high. The data voltage of the negative polarity (−) is supplied to the source electrode 224 of the second transistor 222, which has a value between a reference voltage VR and the VD_N. Therefore, it is sufficient that the gate voltage turning on the second transistor 222 is a value of (VR+VGS_ON). Referring to FIG. 2B, since the voltage of (VD_P+VGS_ON) is supplied to the gate voltage for turning on the second transistor 222, an unnecessarily high voltage is supplied. The unnecessary voltage causes an increase of the power consumption.

Since the gate voltage for turning off the first transistor 212 is also unnecessarily low, it causes increased power consumption. The data voltage of the positive polarity (+) is supplied to the source electrode 214 of the second transistor 212, which has a value between a reference voltage VR and VD_P. Therefore, it is sufficient that the gate voltage for turning off the first transistor 212 is a value of (VR−VGS_OFF). Referring to FIG. 2B, since the voltage of (VD_N−VGS_OFF) is supplied as the gate voltage for turning on the second transistor 212, an unnecessarily low voltage is supplied. The unnecessary voltage causes increased power consumption.

Accordingly, increased power consumption in the Z inversion system is a problem.

This problem occurs because an identical gate voltage is supplied to both the transistor supplied with the data voltage of the positive polarity (+) and the transistor supplied with the data voltage of the negative polarity (−).

SUMMARY OF THE INVENTION

In one embodiment, a display device comprises a first gate line, a second gate line, and a row of pixels between the first gate line and the second gate line. A first subset of the pixels is supplied with first data voltages of a first polarity. A second subset of the pixels is supplied with second data voltages of a second polarity opposite from the first polarity. The first subset of the pixels is connected to the first gate line and the second subset of the pixels is connected to the second gate line.

In one embodiment, the display device further comprises first data lines connected to the first subset of the pixels and second data lines connected to the second subset of the pixels. A data driver supplies the data voltages of the first polarity to the first data lines and the data voltages of the second polarity to the second data lines.

In one embodiment, the display device comprises a multiplexing circuit to selectively connect outputs of the data driver to the first data lines or the second data lines. In one embodiment, the first data lines are odd data lines and the second data lines are even data lines.

In one embodiment, the display device comprises a gate driver to supply a first gate signal to the first gate line and a second gate signal to the second gate line, the first gate signal having a different maximum voltage than the second gate signal. The first gate signal can have a different minimum voltage than the second gate signal. Additionally, the display device may include a power supply that generates four supply voltages having different magnitudes, the four supply voltages including a first supply voltage, a second supply voltage, a third supply voltage and a fourth supply voltage. A level shifter generates the first gate signal based on the first supply voltage and the second supply voltage, and generates the second gate signal based on the third supply voltage and the fourth supply voltage. Further, the first supply voltage may be higher than the third supply voltage, and the second supply voltage may be higher than the fourth supply voltage.

In one embodiment, the first subset of the pixels alternate with the second subset of the pixels in the row of pixels. In one embodiment, the first gate line is an odd gate line and the second gate line is an even gate line.

In one embodiment, each pixel in the first subset of pixels includes a respective first transistor, a gate of the respective first transistor connected to the first gate line. Each pixel in the second subset of pixels includes a respective second transistor, a gate of the respective second transistor connected to the second gate line.

In one embodiment, the first polarity and the second polarity switch polarity with each frame or sub-frame. In one embodiment, the first polarity is a positive polarity and second polarity is a negative polarity.

In one embodiment, a method of operation in a display device having a row of pixels between a first gate line and a second gate line is disclosed. A first subset of the pixels is supplied with first data voltages of a first polarity. A second subset of the pixels is supplied with second data voltages of a second polarity opposite from the first polarity. A first gate signal is supplied to the first subset of the pixels via the first gate line. A second gate signal is supplied to the second subset of the pixels via the second gate line.

In accordance with an aspect of the present disclosure, a display device is provided. The display device includes: a panel on which pixels defined by intersections of a plurality of gate lines and a plurality of data lines are alternately connected to one side and another side of the data line and the gate line; a data driver which supplies a data voltage having a different polarity to the data lines in odd columns and even columns; and, a gate driver which supplies a gate voltage, which has first polarity and corresponds to a data voltage having the first polarity, to gate lines in odd rows, and supplies a gate voltage, which has second polarity and corresponds to a data voltage having the second polarity, to the gate lines in even rows.

In accordance with another aspect of the present disclosure, a method of driving a display device including a panel on which pixels are defined by intersections of a plurality of gate lines and a plurality of data lines, a data driver which supplies a data voltage to the data lines, and a gate driver, which supplies a gate voltage to the gate lines is provided. The method includes: supplying by the data driver, a data voltage having a first polarity to the data lines in odd columns and a data voltage having a second polarity to the data lines in even columns; and, supplying by the gate driver a gate voltage, which corresponds to the data voltage having the first polarity and has the first polarity, to the pixels connected to the data lines in the odd columns, and a gate voltage, which corresponds to the data voltage having the second polarity and has the second polarity, to the pixels connected to the data lines in the even columns.

According to embodiments of the present disclosure, as described above, there is an advantage in that gate voltages of different polarities are supplied to a transistor supplied with a data voltage of a positive polarity (+) and a transistor supplied with a data voltage of a negative polarity (−), so as to decrease a magnitude of the gate voltage signals. The magnitude of the gate voltage signals decrease, resulting in a reduction in power consumption.

Further, according to embodiments of the present disclosure, there is another advantage in that the transistors supplied with the data voltage of the identical polarity are connected by the gate line, thereby supplying the gate voltage corresponding to the polarity of the data voltage through the gate line. When the data voltage for each gate line has the identical polarity, the gate voltage supplied to each gate line may be optimized so as to be adjusted to the polarity of the data voltage.

According to embodiments of the present disclosure, a multiplexing circuit routes data voltages to data lines. Transistors of the multiplexing circuit are supplied with gate voltages that correspond to the polarity of the data voltages to further reduce power consumption.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Figure 1:
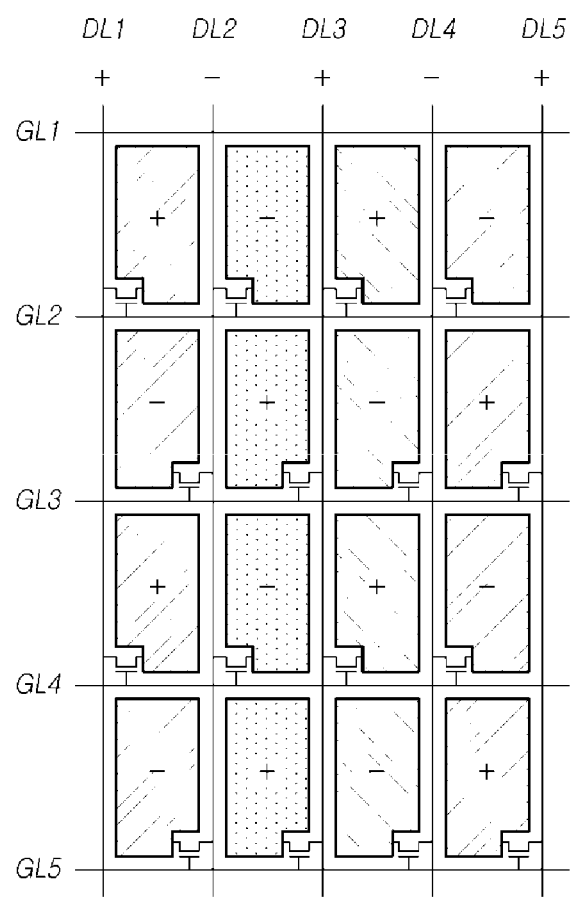
FIG. 1 is a view schematically illustrating a configuration of a pixel in a Z-inversion system.

Hereinafter, exemplary embodiments of the present invention will be described with reference to the exemplary drawings. In the following description, the same elements will be designated by the same reference numerals although they are shown in different drawings. Further, in the following description of embodiments of the present invention, a detailed description of known functions and configurations incorporated herein will be omitted when it may make the subject matter of the present invention rather unclear.

In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. In the case that it is described that a certain structural element "is connected to", "is coupled with", or "is in contact with" another structural element, it should be interpreted that another structural element may "be connected to", "be coupled with", or "be in contact with" other structural elements as well as that the certain structural element is directly connected to or is in direct contact with another structural element. Likewise, when it is described that a certain element is formed "on" or "under" another element, it should be understood that the certain element may be formed either directly or indirectly via a still another element on or under the another element. Additionally, terms such as gate voltage and gate voltage signal or data voltage and data voltage signal may be used interchangeably.

Figure 3:
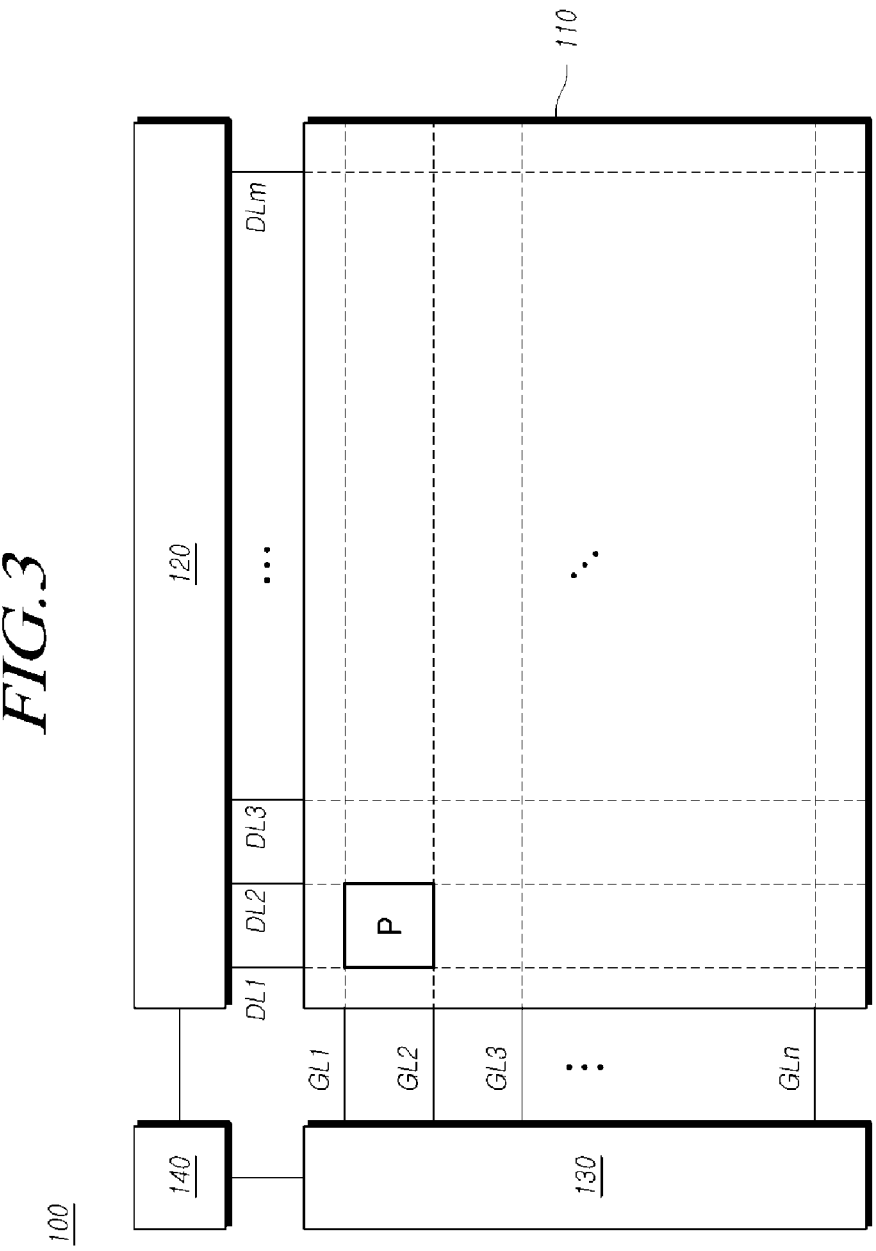
FIG. 3 is a view illustrating a system of a display device to which embodiments in the description is applied.

FIG. 3 is a view illustrating a system of a display device to which embodiments in the description is applied.

Referring to FIG. 3, a display device 100 may include a panel 110, a data driver 120, and a gate driver 130. Further, the display device 100 further includes a timing controller 140 according to a configuration of the embodiment. Hereinafter, an embodiment in which the display device 100 includes the timing controller 140 will be described.

The timing controller 140 may output a data control signal DCS for controlling the data driver 120 and a gate control signal GCS, based on an external timing signal such as vertical/horizontal synchronization signals Vsync and Vsync, an image data RGB, and a clock signal CLK, input from a host system (not shown).

Further, the timing controller 140 may convert the image data RGB input from the host system (not shown) into a data signal used in the data driver 120, and supply the converted image data R', G', and B' to the data driver 120. For example, the timing controller 140 may supply image data R', G', and B' that is converted to be suitable for a resolution of a panel 110 or a pixel configuration to the data driver 120. Herein, the image data RGB, and the converted image data R', G', and B' may be referred to as an image signal, an image digital data, or a data.

The data driver 120 converts the converted image data R', G', and B' into a data voltage (an analog pixel signal or a data signal) which is a voltage value corresponding to a gradation value, and supplies the data voltage to a data line in response to the data control signal DCS and the converted image data R', G', and B' which are input from the timing controller 140.

The gate driver 130 sequentially supplies a gate signal, such as a scan signal, a gate pulse, a scan pulse, or a gate on signal, to a gate line in response to the gate control signal GCS input from the timing controller 140.

The panel 110 includes a plurality of pixels defined by the intersections of a plurality gate lines GL1, GL2, . . . , and GLn, and a plurality of data lines DL1, DL2, . . . , and DLm. The pixels are organized into an array having n rows of pixels and m columns of pixels.

The gate line GL and the data line DL are connected to each pixel of the panel 110, between which a transistor is formed. The gate driver 130 supplies a gate signal to the gate line GL to turn on such transistor, so as to allow the data line DL to be connected to the pixel. Further, a data voltage output from the data driver 120 is applied to the pixel connected to the data line DL so as to display an image.

Each pixel may have another configuration according to an image display scheme of the panel 110. For example, in the case where the panel 110 is a liquid crystal display, the pixel may have a configuration in which a liquid crystal is arranged between both electrodes.

As another example of the pixel, in the case where the panel 110 is an organic light emitting device (OLED)

display, the pixel may include at least one OLED having an anode which is a first electrode, a cathode which is a second electrode, and a light emitting layer. The light emitting layer included in each OLED may include at least one organic light emitting layer among red, green, blue and white organic light emitting layers, or a white organic light emitting layer.

Hereinafter, an embodiment in which the panel is a liquid crystal display panel will be described for convenience of the description. However, as described above, the panel 100 may be another type of panel, such as an OLED panel. However, the present invention is not limited to any particular type of display panel.

The panel 110, which uses liquid crystals, includes an array substrate, including a transistor which is a switching element for controlling turn on/off of each pixel area, an upper substrate having a color filter and/or black matrix, and a liquid crystal substance layer. An arrangement of a liquid crystal layer is adjusted according to an electric field applied to a pixel electrode and a common voltage electrode provided to the pixel area, and permeability of light is controlled to display an image.

In the array substrate, an active area AA including one or more pixels for displaying the image and a non-active area NA are defined. Further, a plurality of gate lines GL and a plurality of data lines DL intersect with each other to define pixels P on an inner surface of the active area AA of the array substrate, which is usually called a lower substrate, and each intersection between the gate lines and the data lines is provided with a Thin film transistor T which have a one-to-one correspondence to and is connected to a transparent pixel electrode (not shown) in each pixel P.

On the array substrate, a plurality of layers, such as a gate metal layer, a semiconductor layer, a source/drain metal layer, a pixel electrode layer, and a common electrode layer, are formed to include thin film transistors and wire lines as described above, and an inter-layer insulation layer for insulation or a protection layer for protection may be formed between every layer.

In a Twisted Nematic (TN) type of liquid crystal display device, liquid crystal is injected between an array substrate having a pixel electrode formed thereon, and an upper substrate having a common voltage electrode formed thereon, separated from each other, and liquid crystal molecules in a nematic phase are driven in a direction perpendicular to the substrates. However, a liquid crystal display device of the twisted nematic type, as described above, is disadvantageous in that it has a narrow viewing angle of about 90 degrees.

An In-Plane Switching (IPS) type liquid crystal display device drives liquid crystal molecules in a direction parallel to the substrate to thereby increase the viewing angle to 170 degrees or larger. The IPS type liquid crystal display device basically includes a pixel electrode and a common voltage electrode simultaneously formed on a lower substrate or an array substrate. However, there are two types of IPS type crystal display devices including one type in which both of the pixel electrode and the common voltage electrode are formed on the same layer and a Fringe Field Switching (FFS) type in which both of the electrodes are formed to be horizontally spaced apart from each other with one or more insulation layers between them and one of the electrodes has a shape of fingers.

Further, a connection pad for connecting to a driving unit disposed at an inner or outer portion of the substrate, a signal application pad for applying a reference voltage or reference signals, and various pads for measurement may be formed on a part of the Non-Active area (NA) outside of the Active Area (AA) in the array substrate.

Figure 4:
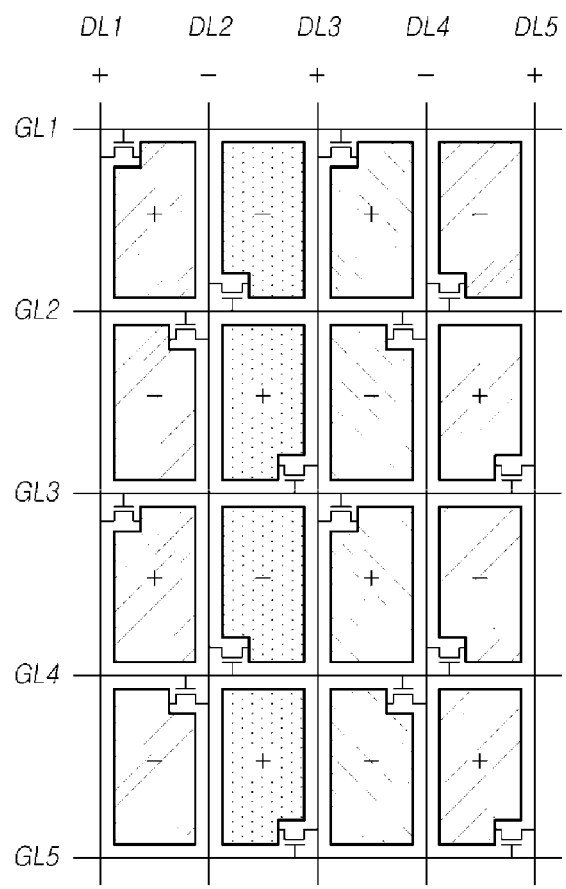
FIG. 4 is a view illustrating a configuration of an array according to an embodiment of the present invention.

FIG. 4 is a view illustrating a configuration of a pixel array according to an embodiment of the present invention. FIG. 4 is a view illustrating a part of the array substrate. The panel 110 has a pixel configuration shown in FIG. 4 repeatedly arranged thereon.

Referring to FIG. 4, intersections of the plural gate lines GL1, GL2, GL3, GL4 and GL5, and the plural data lines DL1, DL2, DL3, DL4 and DL5 define the pixels. The gate line GL and the data line DL are connected to each pixel, and a transistor is formed in each pixel. The transistors are alternately connected to the gate lines GL and the data lines DL. If a direction in which the gate line is arranged is referred to as a row, and a direction in which the data line is arranged is referred to as a column, the transistors alternate on upper and lower sides of a gate line and are connected to the gate line, and alternate on left and right sides or a data line and are connected to the data line. For example, the transistors of a first column of pixels are alternately connected to either the first data line DL1 and the second data line DL2, which are located at the left and right sides of each transistor. Further, the transistors (more specifically, the transistor gates) of the first row of pixels are alternately connected to either the first gate line GL1 and the second gate line GL2, which are located at the upper and lower sides of each transistor.

The data driver 120 supplies data voltages to the pixels through the data lines DL1, DL2, DL3, DL4 and DL5. In this event, the data driver may supply the data voltages having different polarities to the odd data lines and the even data lines. Referring to FIG. 4, data voltages with positive polarity (+) are supplied to the data lines DL1, DL3 and DL5 in the odd columns, and data voltages with negative polarity (−) are supplied to the data lines DL2 and DL4 in the even columns. The positive polarity (+) data voltages are opposite in polarity from the negative polarity (−) data voltages.

In this case, as the pixels are alternately connected to the data lines DL1, DL2, DL3, DL4 and DL5, the polarities of the data voltage supplied to the pixels alternate. For example, signs + and − marked on the pixels in FIG. 4 indicate polarities of the data voltage supplied to each pixel, and every pixel has a different polarity from adjacent pixels. The pixels can thus be logically divided into a positive polarity (+) subset of pixels and a negative polarity (−) subset of pixels. Each row and column of pixels includes both positive polarity (+) and negative polarity (−) pixels that alternate with each other.

Figure 5:
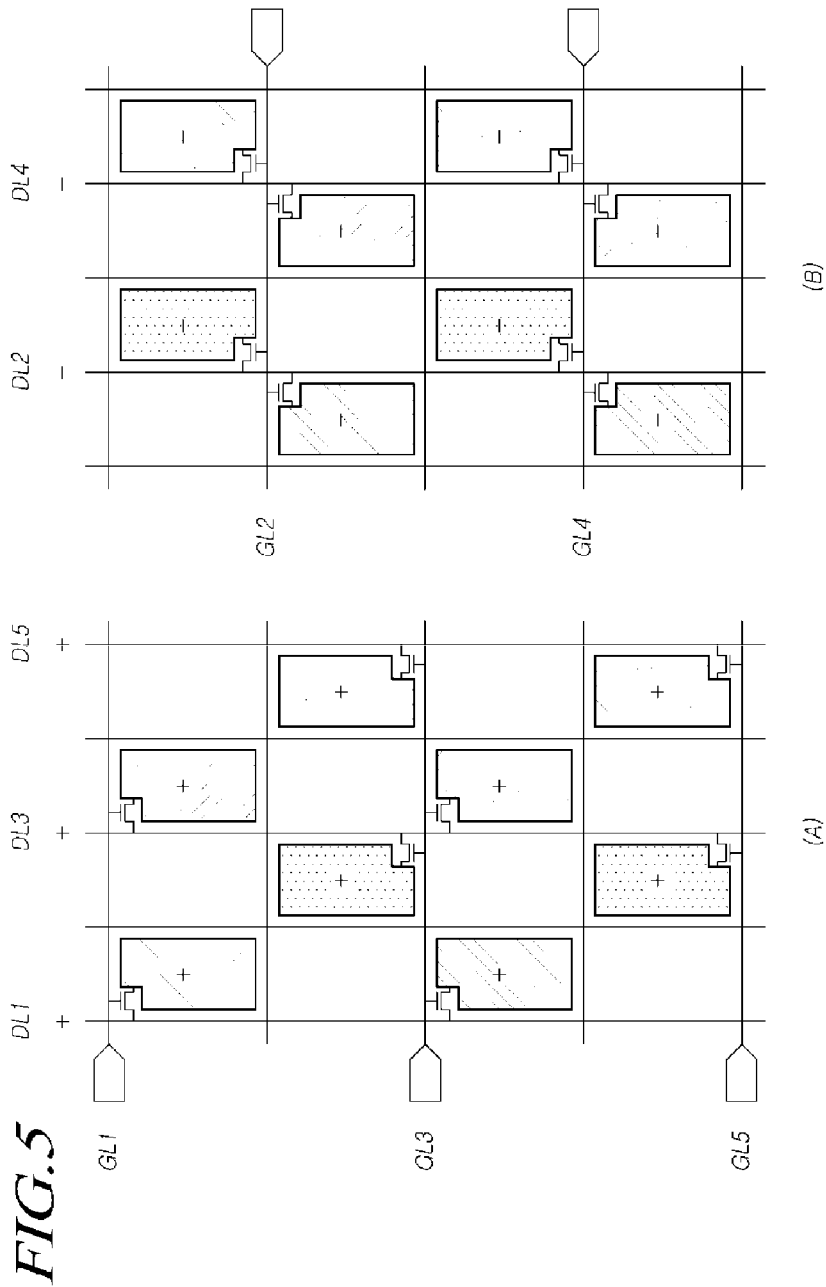
FIG. 5 is a view illustrating pixels of FIG. 4 separated according to polarity of each pixel.

FIG. 5 is a view illustrating pixels of FIG. 4 separated according to polarity of each pixel. FIG. 5A shows pixels having the positive polarity, and FIG. 5B shows pixels having the negative polarity.

Referring to FIG. 5, the pixels connected to every gate line have the identical polarity. For example, in FIG. 5A, all pixels connected to the first gate line GL1 have the positive polarity, and in FIG. 5B, all pixels connected to the second gate line GL2 have the negative polarity. With reference to the first pixel row in FIG. 5A, the positive polarity pixels are connected to the first gate line GL1. With reference to the first pixel row in FIG. 5B, the negative polarity pixels are connected to the second gate line. Further, all pixels connected to the remaining gate lines GL3, GL4 and GL5 have the identical polarity to other pixels connected to the same gate lines.

Since the pixels connected to the gate lines GL1, GL2, GL3, GL4, and GL5 have the same polarity (the polarity of the data voltages supplied to the pixels) as described above, the gate driver 130 according to the embodiment supplies gate voltage signals in correspondence to the polarity of the data voltage supplied to the pixels. For example, the gate driver 130 supplies a gate voltage signal corresponding to data voltages with positive polarity to the first gate line GL1, and a gate voltage signal corresponding to data voltages with negative polarity to the second gate line GL2. Herein, for the convenience of the description, the gate voltage signal corresponding to the data voltage with the positive polarity is referred to as the positive gate voltage signal, and the gate voltage signal corresponding to the data voltage with the negative polarity is referred to as the negative gate voltage.

A waveform of the gate voltage signal with positive polarity and the gate voltage signal with negative polarity which the gate driver 130 supplies will be described with reference to FIG. 6.

Figure 6:
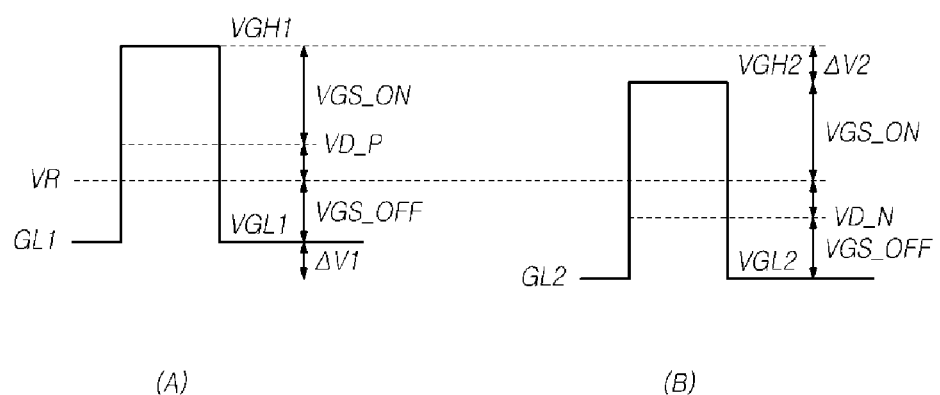
FIG. 6 is a view illustrating a waveform of a gate voltage supplied through a first gate line GL1 and a second gate line GL2 of FIG. 5.

FIG. 6 is a view illustrating a waveform of the gate voltage supplied through the first gate line GL1 and the second gate line GL2 of FIG. 5.

Referring to FIG. 6, the gate driver 130 supplies the positive gate voltage to the first gate line GL1, and the negative gate voltage to the second gate line GL2.

The positive gate voltage has a pulse waveform which has a maximum voltage VGH1 and a minimum voltage VGL1. The negative gate voltage has a pulse waveform which has a maximum voltage VGH2 and a minimum voltage VGL2. The VGH1 and the VGH2 are the gate-on voltages for turning on the transistors connected to the first gate line GL1 and the second gate line GL2, respectively. The maximum voltage VGH1 is different than and higher than maximum voltage VGH2. Also, the VGL1 and the VGL2 are the gate-off voltages for turning off the transistors connected to the first gate line GL1 and the second gate line GL2, respectively. The minimum voltage VGHL1 is also different than and higher than the minimum voltage VGL2.

The gate-on voltages VGH1 and VGH2 and the gate-off voltages VGL1 and VGL2 are determined by the source electrode voltage and the gate-source voltage (the gate electrode and the source electrode). In the case of the transistor located in the pixel, the magnitude of the gate-on voltages VGH1 and VGH2 and the gate-off voltages VGL1 and VGL2 is determined by the voltage of the source electrode connected to the data line, and the voltage between the source electrode and the gate electrode.

If the gate voltage of the transistor is VG, the voltage of the source electrode connected to the data line is VS, and the gate-source voltage is VGS, the relation of the VG, the VGS and the VS may be defined by Equation (1).

$$VG = VGS + VS \quad (1)$$

According to Equation 1, the gate voltage VG is determined by the gate-source voltage VGS and the voltage VS of the source electrode. Referring to FIG. 6, since the gate voltage has the pulse waveform having two values of gate-on voltage and gate-off voltage, the gate-source voltage VGS considers the gate-source voltage VGS_ON for turning on the transistor and the gate-source voltage VGS_OFF for turning off the transistor. The voltages VGS_ON and VGS_OFF for turning on/off the transistor are values which are determined depending on transistor characteristics, and are substantially regarded as a constant.

The range of the source electrode voltage VS, which is another factor in determining the gate voltage VG, corresponds to either the positive data voltage or the negative data voltage because the source voltage VS is identical to the data voltage supplied to the data line. The data voltage is a value that changes according to pixel brightness and has different range of variation according to the polarity of the data voltage. First, in the case where the data voltage has the positive polarity, the voltage VS varies between the positive minimum voltage, e.g., a reference voltage VR, and the positive maximum voltage VD_P. First, in the case where the data voltage has the negative polarity, the voltage VS varies between the negative minimum voltage VD_N and the negative maximum voltage, e.g., a reference voltage VR. Hereinafter, it is described that all of the positive minimum voltages and the negative maximum voltages correspond to the reference voltage VR, for the convenience of the description.

Referring to FIG. 6, the positive gate voltage supplied to the first gate line GL1 has a pulse waveform which has a maximum voltage VGH1 and a minimum voltage VGL1. Further, the negative gate voltage supplied to the second gate line GL2 has a pulse waveform which has a maximum voltage VGH2 and a minimum voltage VGL2.

The VGH1, VGL1, VGH2 and VGL2 are defined by Equation (2).

$$VGH1 = VGS\_ON + VD\_P$$

$$VGL1 = VGS\_OFF + VR,$$

$$VGH2 = VGS\_ON + VR$$

$$VGL2 = VGS\_OFF + VD\_N \quad (2)$$

This equation assumes that VGS_OFF and VD_N are negative values.

Since a plurality of data lines are connected to one gate line, the gate driver 130 determines a maximum value of the source electrode voltage VS when determining the magnitude of the gate-on voltage. Referring to FIG. 5 again, the first gate line GL1 is connected to the pixels having positive polarity. For the first gate line GL1, the maximum gate voltage output by the gate driver 130 is set in accordance with the positive maximum voltage VD_P. Further, the gate driver 130 supplies the voltage VGH1 corresponding to the VGS_ON+VD_P as the gate-on voltage to the first gate line GL1. On the other hand, the second gate line GL2 is connected to the pixels having negative polarity. For the second gate line GL2, the maximum gate voltage output by the gate driver 130 is set in accordance with the reference voltage VR. Further, the gate driver 130 supplies the voltage VGH2 corresponding to the VGS_ON+VR as the gate-on voltage to the second gate line GL2.

The gate driver 130 determines a magnitude of the gate-off voltage in the same manner, as described above, based on the minimum value of the source electrode voltage VS. Referring to FIG. 5 again, the first gate line GL1 is connected to the pixels having positive polarity. For the first gate line GL1, the minimum gate voltage output by the gate driver 130 is set in accordance with the reference voltage VR. Further, the gate driver 130 supplies the voltage VGL1 corresponding to the VGS_OFF+VR as the gate-off voltage to the first gate line GL1. On the other hand, the second gate line GL2 is connected to the pixels having negative polarity. For the second gate line GL2, the minimum gate voltage output by the gate driver 130 is set in accordance with the negative minimum voltage VD_N. Further, the gate driver 130 supplies the voltage VGL2 corresponding to the VGS_OFF+VD_N as the gate-off voltage to the second gate line GL2.

Figure 2:
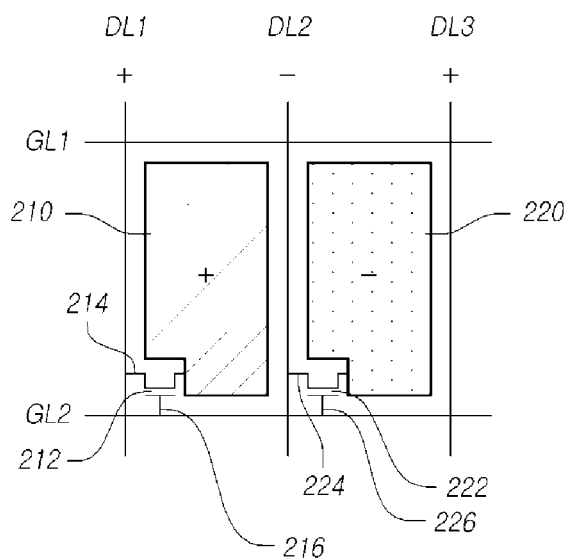
FIG. 2 is a view illustrating a magnitude of a gate voltage supplied to a second gate line GL2.
Figure 2:
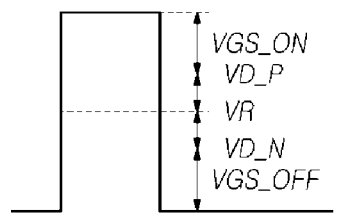

When the waveform of FIG. 6 is compared with the waveform of FIG. 2, the magnitude of the positive gate voltage supplied to the first gate line GL1 is smaller than that of the waveform shown in FIG. 2B by ΔV1, and the magnitude of the negative gate voltage supplied to the second gate line GL2 is smaller than that of the waveform shown in FIG. 2B by ΔV2. Further, ΔV1 is equal to the magnitude of the VD_N, and ΔV2 is equal to the magnitude of the VD_P.

Although only the waveform of the first gate line GL1 and the second gate line GL2 is shown in FIG. 6, other gate lines have similar waveforms. For example, a positive gate voltage having the same waveform as that of the first gate line GL1 is supplied to gate lines GL1, GL3 and GL5 in odd rows. Further, a negative gate voltage having the same waveform as that of the second gate line is supplied to gate lines GL2 and GL4 in even rows.

The magnitude (a difference between the maximum value and the minimum value) of the gate voltage is used to determine an amount of electric power consumed in a gate line, and the power consumption of the gate line is generally proportional to a square of the magnitude of the gate voltage. When the waveform of FIG. 6 is compared with the waveform of FIG. 2, the display device 100, according to the embodiment, has reduced power consumption because the magnitude of the gate voltage according to the embodiment is smaller by ΔV1 or ΔV2.

In the description of the display device 100 with reference to FIGS. 4 to 6, the data lines DL1, DL2, DL3, DL4 and DL5, and the gate lines GL1, GL2, GL3, GL4 and GL5 are each connected to pixels having the same polarity in the display device 100 according to the embodiment. Therefore, the source electrode voltage VS of the transistor connected to the gate lines GL1, GL2, GL3, GL4 and GL5 is varied within a range of the polarity. For example, in the case of the positive polarity, the source electrode voltage VS is varied within a range from VR to VD_P. As another example, in the case of the negative polarity, the source electrode voltage VS is varied within a range from VD_N to VR. The gate driver 130 controls the gate voltage supplied to the gate line, in consideration of the variation range of the source electrode voltage VS, so that the gate voltage corresponds to the polarity of the data voltage. For example, if a positive data voltage is supplied to the data lines connected to the first gate line GL1, the gate driver 130 supplies the positive gate voltage corresponding to the positive data voltage. The positive gate voltage has a magnitude which is smaller than the gate voltage shown in FIG. 2 by ΔV1. The reason that the positive gate voltage is smaller than the gate voltage shown in FIG. 2 by ΔV1 is because the variation of the source electrode voltage VS is considered to be small. In other words, the gate voltage is determined based on both the positive data voltage and the negative data voltage because the pixels having different polarities are connected to one gate line, as shown in FIG. 2, while in the display device 100 according to the embodiment, the magnitude of the gate voltage can be reduced because the gate voltage is based on only the positive data voltage or the negative data voltage because pixels having the same polarity are connected to the gate line.

On the other hand, VGH1, VGL1, VGH2 and VGL2, which the gate driver 130 supplies to the gate lines, may be supplied from other configurations of the display device 100.

Figure 7:
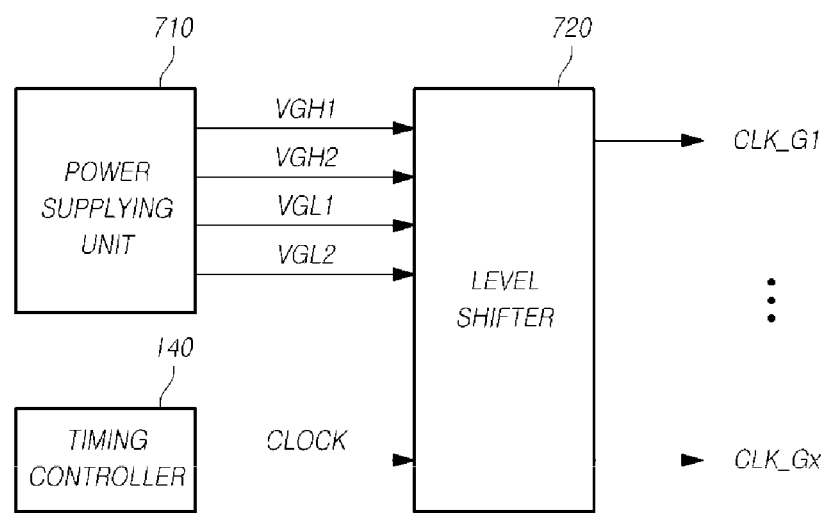
FIG. 7 is a view illustrating configurations providing a gate clock signal to a gate driver 130.
Figure 7:
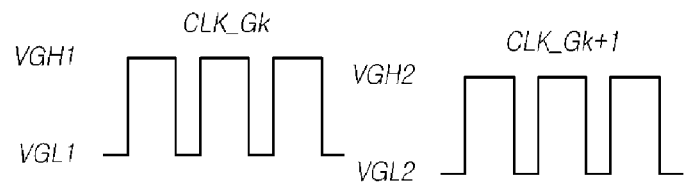

FIG. 7 is a view illustrating configurations providing a gate clock signal to a gate driver 130.

Referring to FIG. 7, the display device 100 may further include an electric power supplying unit 710, and a level shifter 720.

The electric power supplying unit 710 may be an electric power converter for converting electric power supplied from an external source, e.g. a battery or a commercially available electric power source, to the form of electric power used in internal configurations, e.g., the gate driver 130. The electric power supplying unit 710 may internally include a switching mode power supply (SMPS), such as a buck-converter module or a boost-converter module. Alternatively, the electric power supplying unit 710 may performs a conversion of electric power by using a linear regulator. The electric power supplying unit 710 outputs four supply voltages, which have different magnitudes respectively, by using such an electric power converting circuit. The four supply voltages may include a maximum voltage VGH1 and a minimum voltage VGL1 of the positive gate voltage, and a maximum voltage VGH2 and a minimum voltage VGL2 of the negative gate voltage.

The four supply voltages VGH1, VGL1, VGH2 and VGL2 are transferred to the level shifter 720. The timing controller 140 generates clock information CLOCK. The timing controller 140 generates a number x of clock signals CLK_G1, CLK_G2, CLK_G3, CLK_G4, . . . , and CLK_Gx, based on the four supply voltages VGH1, VGL1, VGH2 and VGL2 supplied from the electric power supplying unit 710 and the CLOCK input. In this event, the level shifter 720 selects two voltage levels from the four supply voltages VGH1, VGL1, VGH2 and VGL2 so as to output a gate clock signal CLK_GK having a positive gate voltage and a gate clock signal CLK_GK+1 having a negative gate voltage. Herein, the gate clock signal CLK_GK has the positive gate voltage, which means that a maximum value and a minimum value of a pulse waveform of the gate clock signal CLK_GK are substantially identical to the maximum voltage VGH1 and the minimum voltage VGL1 of the positive gate voltage. Similarly, the gate clock signal CLK_GK+1 has the negative gate voltage, which means that a maximum value and a minimum value of a pulse waveform of the gate clock signal CLK_GK+1 are substantially identical to the maximum voltage VGH2 and the minimum voltage VGL2 of the negative gate voltage.

FIG. 7B shows the gate clock signal output from the level shifter 720 and having two polarities. In FIG. 7B, the gate clock signal CLK_GK having the positive gate voltage is output to the gate lines GL1, GL3, GL5 in the odd rows shown in FIG. 5. Gate clock signal CLK_GK is generated using supply voltages VGH1 and VGL1. The gate clock signal CLK_GK+1 having the negative gate voltage is output to the gate lines GL2 and GL4 in the even rows shown in FIG. 5. Gate clock signal CLK_GK+1 is generated using supply voltages VHG2 and VGL2.

The gate driver 130 is divided into two parts that are located at a first side and a second side of the panel 110, and supplies the positive gate voltage to the first side and the negative gate voltage to the second side of the panel 110.

Figure 8:
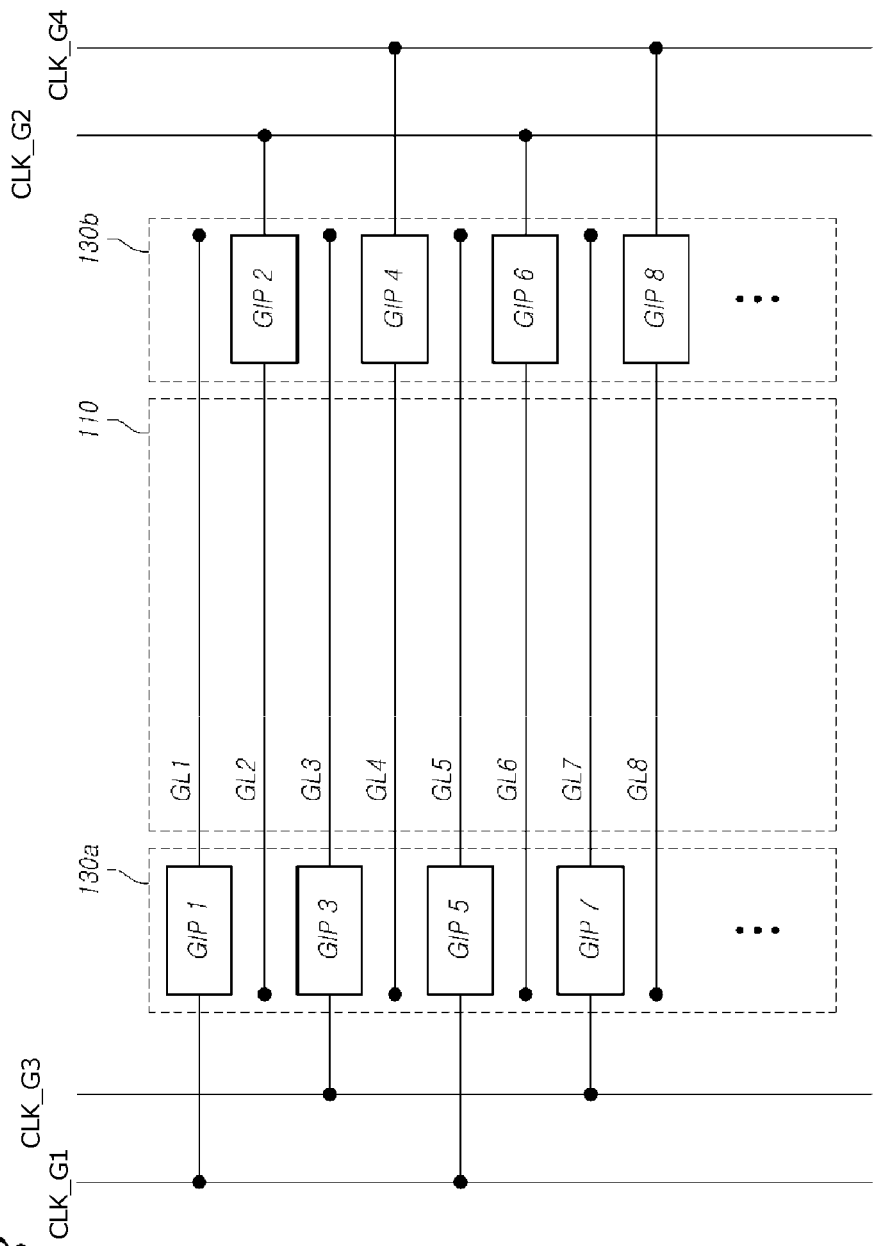
FIG. 8 is a view illustrating gate drive integrated circuits supplied with the gate clock signal of FIG. 7.

FIG. 8 is a view illustrating gate drive ICs in panel (GIP) supplied with the gate clock signals of FIG. 7.

Referring to FIG. 8, the gate driver 130 may form the first side and the second side of the panel 110. That is, a plurality of gate drive ICs GIP1, GIP2, . . . , GIPn included in the gate driver 130 may be formed on the first side and the second side of the panel 110. The gate driver 130a formed on the first side of the panel 110 includes GIP1, GIP3, GIP5, GIP7, . . . , GIPn, and the gate driver 130b formed on the second side of the panel 110 includes GIP2, GIP4, GIP6, GIP5, . . . , GIPn.

Referring to FIG. 8, each of the plurality of gate drive ICs GIP1, GIP2, . . . , GIPn corresponds to one gate line GL.

That is, each gate drive IC supplies gate voltage to one gate line GL. In this case, the number of the gate drive ICs is identical to the number of the gate line.

As shown in FIG. 8, when the plurality of gate drive ICs is divided and formed on both the first side and the second side of the panel 110, four gate clock signals CLK_G1, CLK_G2, CLK_G3, and CLK_G4 are divided and input into the gate drive ICs GIP1, GIP3, GIP5, GIP7, . . . formed on the first side and the gate drive ICs GIP2, GIP4, GIP6, GIP8, . . . formed on the second side.

That is, among the four gate clock signals CLK_G1, CLK_G2, CLK_G3, and CLK_G4, the gate clock signals CLK_G1 and CLK_G3 may be input to the gate drive ICs GIP1, GIP3, GIP5, GIP7, . . . formed on the first side, and the gate clock signals CLK_G2 and CLK_G4 may be input to the gate drive ICs GIP2, GIP4, GIP6, GIP8, . . . formed on the second side.

Here, the gate clock signal CLK_G1 and CLK_G3 input to the first side may be the positive gate voltage. Here, the gate clock signal CLK_G2 and CLK_G4 input to the second side may be the negative gate voltage. Therefore, the gate drive ICs GIP1, GIP3, GIP5, GIP7 on the first side supplies the positive gate voltage to the gate lines GL1, GL3, GL5, GL7 in the odd rows, and the gate drive ICs GIP2, GIP4, GIP6, GIP8, on the second side supplies the negative gate voltage to the gate lines GL2, GL4, GL6, GL8, in the even rows.

On the other hand, the data driver 120 may change the polarity of the data voltage by frame or sub-frame. As described above, when the data driver 120 changes polarity of the data voltage, the gate driver 130 changes polarity of the gate voltage signal in correspondence to the change of the data voltage. For example, the gate driver 130 may supply positive gate voltage from the first sub-frame or the first frame to the gate line in the even rows, and supply negative gate voltage from the second sub-frame or the second frame to the gate line in the odd rows.

The change of polarity in the gate voltage signal of the gate driver 130 may be determined by the level shifter 720. The level shifter 720 may have previously identified the polarity of the data voltages and determined the polarity of the gate voltage signals supplied to each gate line according to the polarity of the data voltages so as to output the gate clock signal. Such a gate clock signal may include gate voltage having the polarity as shown in FIG. 7.

Up to now, the embodiment in which the gate voltage supplied to the gate line is enabled to have the polarity so as to reduce the magnitude of the gate voltage has been described.

Hereinafter, an embodiment in which a DeMUX (Demultipexer) enables the gate voltage to have the polarity will be described.

Figure 9:
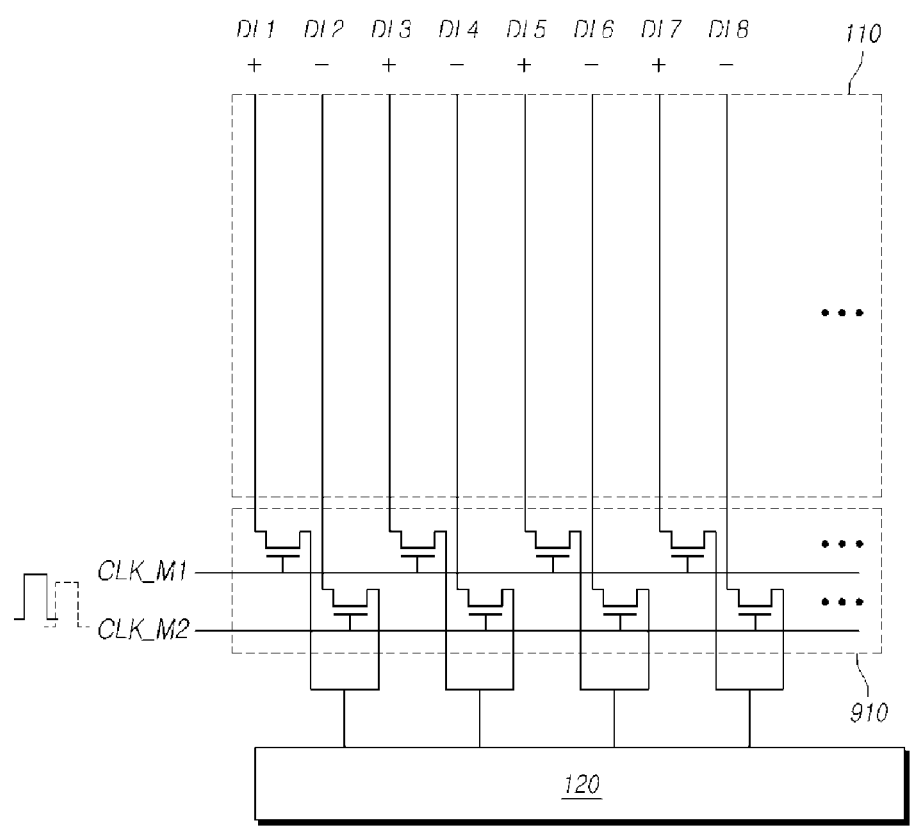
FIG. 9 is a view illustrating data lines diverged through an MUX.

FIG. 9 is a view illustrating data lines routed through a DeMUX.

Referring to FIG. 9, the DeMUX 910 is a multiplexing circuit that selectively routes the data voltage supplied from the data driver 120 to one of two data lines by using transistors.

A first DeMUX clock signal CLK_M1 is input to the gate electrode of the transistors to route the data voltages to the data lines DL1, DL3, DL5 and DL7 in the odd columns. A second DeMUX clock signal CLK_M2 is input to the gate electrode of the transistors to route the data voltages to the data lines DL2, DL4, DL6 and DL8 in the even columns.

When the gate-on voltage is supplied through the first DeMUX clock signal CLK_M1, the data driver 120 may supply the data voltages to the data lines DL1, DL3, DL5 and DL7 in the odd columns. When the gate-on voltage is supplied through the second DeMUX clock signal CLK_M2, the data driver 120 may supply the data voltages to the data lines DL2, DL4, DL6 and DL8 in the even columns.

The transistors of the data lines, in which the same polarity is input, may be connected to one DeMUX clock signal. Referring to FIG. 9, the transistors for data lines DL1, DL3, DL5 and DL7 in the odd column to which the positive polarity is input may be connected to the first DeMUX clock signal CLK_M1. The transistors for data lines DL2, DL4, DL6 and DL8 to which the negative polarity is input are connected to the second DeMUX signal CLK_M2.

If the data voltage having a positive polarity is supplied to the transistor connected to the first DeMUX clock signal CLK_M1, the first DeMUX clock signal CLK_M1 is supplied in a manner that corresponds to a positive gate voltage. Similarly, the second DeMUX clock signal CLK_M2 is supplied in a manner that corresponds to the negative gate voltage. In other words, the DeMUX clock signals are supplied so that the gate voltages correspond to the polarity of the data voltage.

If the gate voltage in the MUX 910 is determined to correspond to the polarity of the data voltage (e.g., the gate voltage is determined to be a positive gate voltage or negative gate voltage), the magnitude of the gate voltage swing is reduced, resulting in decrease of the power consumption in the display device 100.

Figure 10:
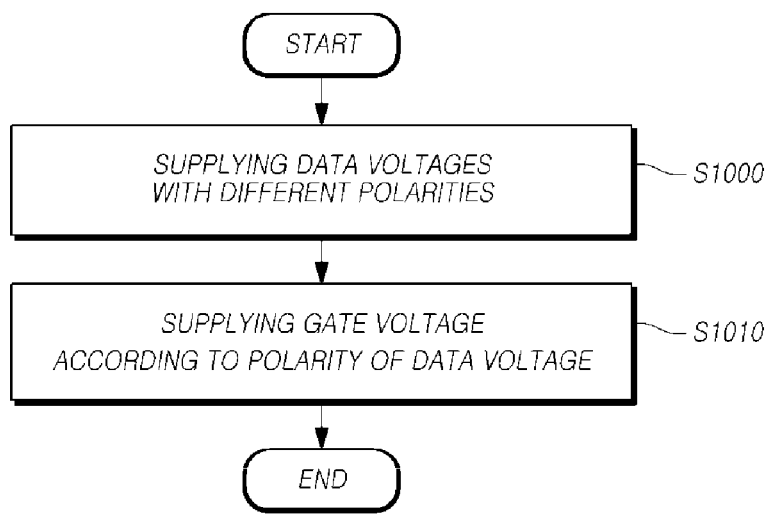
FIG. 10 is a flowchart illustrating a process of driving a display device according to another embodiment.

FIG. 10 is a flowchart illustrating a process of driving a display device according to another embodiment.

Referring to FIG. 10, the data driver 120 supplies data voltages with different polarities to the data lines in the display device 100 in step 1000. In this event, the data driver 120 may supply data voltages having positive polarity to the data lines in the odd columns, and supply data voltages having negative polarity to the data lines in the even columns.

The components which supplies the gate voltage to the transistor (to which the data lines and the source electrode or the drain electrode are connected) supplies the gate voltage to correspond to the polarity of the data voltage supplied to the source electrode or the drain electrode of the transistor in step S1010. In this event, an example of the components supplying the gate voltage to the transistor may be the gate driver 130. Further, another example of the component supplying the gate voltage to the transistor may be the DeMUX 910.

As the data driver 120 supplies data voltages having positive polarity to the data lines in the odd columns, and supplies data voltages having the negative polarity to data lines in the even columns in step S1000, the gate driver 130 may supply positive gate voltages corresponding to positive data voltages to the pixels connected to the data lines in the odd columns and supply negative gate voltages corresponding to negative data voltages to the pixels connected to the data lines in the even columns.

Like the embodiments described above, when the gate voltage is controlled to correspond to the polarity of the data voltage, the magnitude of the gate voltage may be reduced, as compared with the conventional art. Because the gate voltage VG includes the gate-source voltage VGS and the source electrode voltage VS, if the gate voltage VG is set differently depending on the data voltage polarity, the amplitude range of the gate voltage VG is reduced by 50% compared to the conventional art. For example, if the gate on voltage VGS_ON is 15V, the positive maximum voltage VD_P is 5V, the reference voltage is 0V, a negative maximum voltage VD_N is −5V, the gate-off voltage VGS_OFF is −10V, the magnitude of the conventional gate voltage is 35V (15V+5V−(−5V)−(−10V)). On the other hand, in the identical embodiment, the magnitude of the positive gate voltage is 30V (15V+5V−(0V)−(−10V)), and can be reduced by 5V (magnitude of VD_P) when compared with the conventional art.

If the magnitude of the gate voltage is reduced as described above, the power consumption of the display device 100 can be reduced.

Experimental results have shown that, when the gate drive IC of the display device 100 drives transistors according to the embodiment of the present invention, power consumption was reduced by 29% as compared with the conventional art. Further, as a result of simulation, when the DeMUX of the display device 100 was driven according to the embodiment of the present invention, the power consumption was reduced by 29% as compared with the conventional art.

Further, the terms "includes", "constitutes", or "has" mentioned above mean that a corresponding structural element is included unless they have no reverse meaning. Accordingly, it should be interpreted that the terms may not exclude but further include other structural elements. All the terms that are technical, scientific or otherwise agree with the meanings as understood by a person skilled in the art unless defined to the contrary. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, exemplary embodiments of the present disclosure have been described for the sake of brevity and clarity. The scope of the present invention shall be construed on the basis of the accompanying claims in such a manner that all of the technical ideas included within the scope equivalent to the claims belong to the present invention.

What is claimed is:

1. A display device comprising:
   a first gate line;
   a second gate line;
   a third gate line;
   a first row of pixels between the first gate line and the second gate line;
   a second row of pixels between the second gate line and the third gate line, wherein all of the pixels in the first row of pixels and the second row of pixels belong to either a first subset or a second subset, the first subset of the pixels supplied with first data voltages of a first polarity during a frame and the second subset of the pixels supplied with second data voltages of a second polarity opposite from the first polarity during the frame, wherein each pixel in the first subset of the pixels in the first row is connected to the first gate line, each pixel in the first subset of the pixels in the second row is connected to the third gate line and each pixel in the second subset of the pixels is connected to the second gate line;
   first data lines connected to the first subset of pixels and that provide the first data voltages of the first polarity and do not provide the second data voltages of the second polarity during the frame, wherein a data line of the first data lines is connected to a pixel of the first subset of the pixels in the first row and a pixel of the first subset of the pixels in the second row; and
   second data lines connected to the second subset of the pixels and that provide the second data voltages of the second polarity and do not provide the first data voltages of the first polarity during the frame, wherein a data line of the second data lines is connected to a pixel of the second subset of the pixels in the first row and a pixel of the second subset of the pixels in the second row,
   wherein a maximum gate voltage and a minimum gate voltage of a first gate signal for the first gate line are set in accordance with a range of the first data voltages, and a maximum gate voltage and a minimum gate voltage of a second gate signal for the second gate line are set in accordance with a range of the second data voltages,
   wherein the maximum gate voltage of the first gate signal has a different level than the maximum gate voltage of the second gate signal, and the minimum gate voltage of the first gate signal has a different level than the minimum gate voltage of the second gate signal.

2. The display device of claim 1, further comprising:
   a data driver to supply the first data voltages of the first polarity to the first data lines and to supply the second data voltages of the second polarity to the second data lines.

3. The display device of claim 2, further comprising:
   a multiplexing circuit to selectively route the first and second data voltages from the data driver to the first data lines or the second data lines.

4. The display device of claim 2, wherein the first data lines are odd data lines and the second data lines are even data lines.

5. The display device of claim 1, further comprising:
   a power supply to generate four supply voltages having different magnitudes, the four supply voltages including a first supply voltage, a second supply voltage, a third supply voltage and a fourth supply voltage; and
   a level shifter to generate the first gate signal based on the first supply voltage and the second supply voltage, and to generate the second gate signal based on the third supply voltage and the fourth supply voltage.

6. The display device of claim 5, wherein the first supply voltage is higher than the third supply voltage, and the second supply voltage is higher than the fourth supply voltage.

7. The display device of claim 1, wherein the first subset of the pixels alternate with the second subset of the pixels in the row of pixels.

8. The display device of claim 1, wherein the first gate line is an odd gate line and the second gate line is an even gate line.

9. The display device of claim 1, wherein
   each pixel in the first subset of pixels includes a respective first transistor, a gate of the respective first transistor connected to the first gate line, and
   each pixel in the second subset of pixels includes a respective second transistor, a gate of the respective second transistor connected to the second gate line.

10. The display device of claim 9,
    wherein the first data voltages are generated to be in a first voltage range from a reference voltage to a positive maximum voltage, and a high voltage level of the first gate signal supplied to the first gate line is substantially equal to a first gate-source turn on voltage of the respective first transistor plus the positive maximum voltage of the first voltage range, and wherein the second data voltages are generated to be in a second voltage range from a negative minimum voltage to the reference voltage, and a high voltage level of the second gate signal supplied to the second gate line is substantially equal to a second gate-source turn on voltage of the respective second transistor plus the reference voltage.

11. The display device of claim 1, wherein the first polarity and the second polarity switch polarity with each frame.

12. The display device of claim 1, wherein the first polarity is a positive polarity and the second polarity is a negative polarity.

13. A method of operation in a display device having a first row of pixels between a first gate line and a second gate line and a second row of pixels between the second gate line and a third gate line, wherein all of the pixels in the first row of pixels and the second row of pixels belong to either a first subset or a second subset, wherein each pixel in the first subset of pixels in the first row is connected to the first gate line, each pixel in the first subset of pixels in the second row is connected to the third gate line, and each pixel in the second subset of pixels is connected to the second gate line, the method comprising:

supplying the first subset of the pixels with first data voltages of a first polarity via first data lines during a frame, a pixel of the first subset of pixels in the first row and a pixel of the first subset of pixels in the second row being supplied with a data voltage of the first data voltages via a data line of the first data lines;

supplying the second subset of the pixels with second data voltages of a second polarity opposite from the first polarity via second data lines during the frame, the second data voltages of the second polarity not supplied via the first data lines during the frame, and the first data voltages of the first polarity not supplied via the second data lines during the frame;

supplying a first gate signal to each pixel in the first subset of the pixels in the first row via the first gate line; and supplying a second gate signal to each pixel in the second subset of the pixels via the second gate line, wherein a maximum gate voltage and a minimum gate voltage of the first gate signal are set in accordance with a range of the first data voltages, and a maximum gate voltage and a minimum gate voltage of the second gate signal are set in accordance with a range of the second data voltages, wherein the maximum gate voltage of the first gate signal has a different level than the maximum gate voltage of the second gate signal, and the minimum gate voltage of the first gate signal has a different level than the minimum gate voltage of the second gate signal.

14. The method of claim 13, further comprising:
generating the first gate signal based on a first high supply voltage and a first low supply voltage; and
generating the second gate signal based on a second high supply voltage and a second low supply voltage.

15. The method of claim 13, wherein the first gate signal is supplied to a respective first transistor of each pixel in the first subset of pixels, and the second gate signal is supplied to a respective second transistor of each pixel in the second subset of pixels.

16. The method of claim 13, wherein the first polarity and the second polarity switch polarity with each frame.

* * * * *